S. DWIGHT.
Cultivator.
No. 53,592 Patented Apr. 3. 1866.
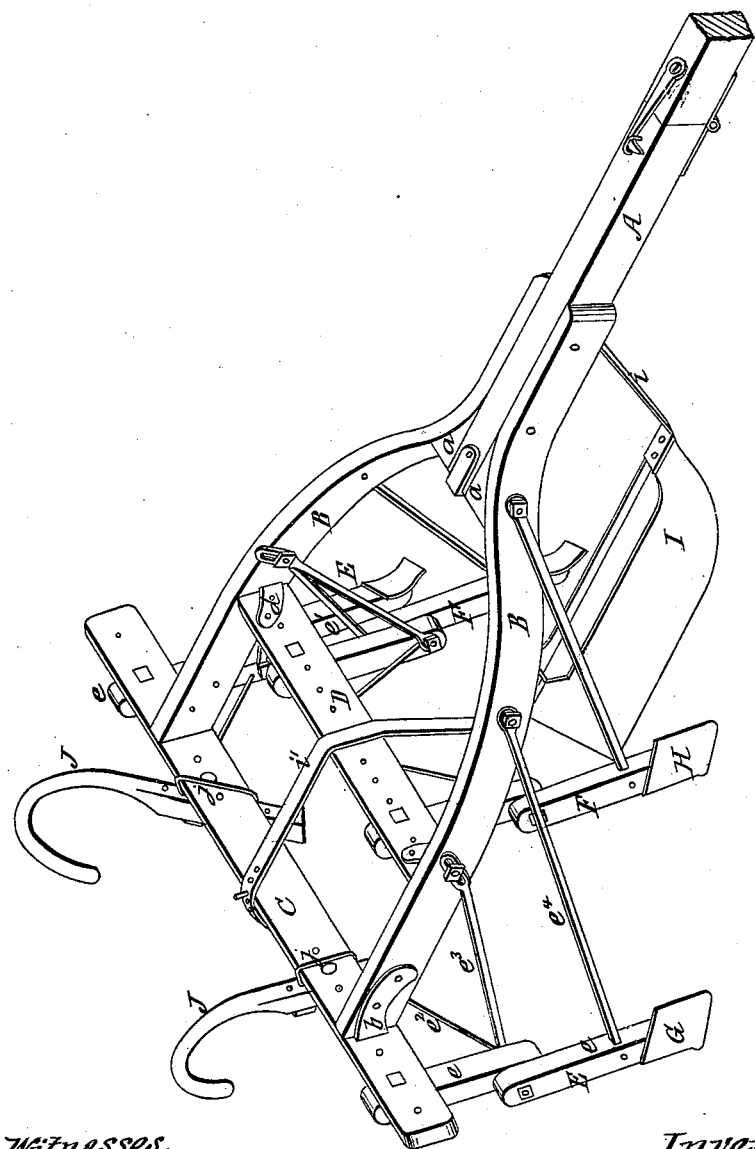

UNITED STATES PATENT OFFICE.

SOLOMON DWIGHT, OF ROCKFORD, ILLINOIS.

IMPROVEMENT IN CULTIVATORS.

Specification forming part of Letters Patent No. 53,592, dated April 3, 1866.

*To all whom it may concern:*

Be it known that I, SOLOMON DWIGHT, of Rockford, in the county of Winnebago and State of Illinois, have invented an Improved Cultivator, of which the following is a full, clear, and exact description, reference being had to the accompanying drawing, which makes part of this specification, and which represents a view in perspective of my improved cultivator.

The tongue A is rigidly secured to the front ends of two elastic side pieces, B, the rear ends of which are provided with brackets $b$, which are bolted to the rear cross-beam, C. Wedges or triangular blocks $a$, between the rear end of the tongue and the side pieces, serve to press them apart, while the brackets, inserted into holes in the rear cross-beam, hold them securely in position, thus imparting a curved form to the frame, and rendering it very strong, while its weight is light.

The brackets $b$ have screwed spindles on their ends, which are inserted into holes in the rear cross-beam, and held by suitable nuts. A series of these holes being formed in the cross-beam, the distance between the side pieces can be increased or diminished at pleasure.

In order to render the frame still stronger, I insert a middle cross-beam, D, between the side timbers, having brackets or screwed spindles $d$ on its ends passing through the side pieces, and secured by nuts.

Two legs or standards, E, are bolted to the rear cross-timber, C, and two, F, to the middle cross-beam. These legs I make in two parts. The upper portions, $e$, of the rear standards are bolted to the rear cross-timber, and braced by rods $e^2$ and by adjustable straps $e^3$, provided on their front end with slots, which play on the spindles of the middle cross-beam, and are held by the same nut. The legs are thus braced firmly laterally and can be adjusted longitudinally.

The upper and lower parts of the legs are pivoted together by a joint, which allows the lower legs, $e'$, to play in a vertical plane. A drag-strap, $e^4$, is pivoted securely at one end to the frame. The other is attached to the legs $e'$ by a wooden pin passing through it. When the plow G strikes an obstacle the pin breaks and allows the plow to swing backward, thus avoiding injury to the machine or team.

The front plow-legs are constructed and arranged in a similar manner, and both front and rear plows may be adjusted laterally by means of a series of holes in their respective cross-beams, or by means of slots and set-screws.

In order to protect the young plants, I employ a sled-shaped shield or guard, I, having its front end connected by a plate-spring, $i$, to the under side of the tongue, and its rear end controlled by a strap, $i'$, passing back to the rear cross-beam, by which means the driver can adjust the shield high or low, as required.

My machine belongs to that class of cultivators which have no wheels, and in which the driver walks behind the machine and guides it by means of handles J, which are clamped to the cross-beams by yokes $j$ and admit of free lateral adjustment. In cultivating high corn it is sometimes convenient for the driver to walk on one side of the machine. By my invention he can place one of the handles on the extreme outer end of the rear cross-beam, and thus walk on one side and guide the machine. The open space in front of the middle beam enables the driver to watch the crop and guide the machine understandingly, while the strap enables him to raise or lower the shield with facility.

What I claim as my invention, and desire to secure by Letters Patent, is—

The combination of the rigid tongue, the curved side pieces, the adjustable rear and middle cross-beams, the adjustable handles, the swiveling plows, and the yielding-spring corn-guard, when constructed, arranged, and operating as described.

In testimony whereof I have hereunto subscribed my name.

SOLOMON DWIGHT.

Witnesses:
WM. THOMPSON,
J. G. MANLOVE.